April 12, 1927.

M. C. SPENCER 1,624,880

MEANS FOR MAINTAINING MOTORS IN DEFINITE SPEED RELATION

Filed Nov. 2, 1926

Inventor,
Millard Cole Spencer,
By *Samuel W Balch*
Attorney.

Patented Apr. 12, 1927.

1,624,880

UNITED STATES PATENT OFFICE.

MILLARD COLE SPENCER, OF EAST ORANGE, NEW JERSEY, ASSIGNOR TO CROCKER-WHEELER ELECTRIC MANUFACTURING COMPANY, OF AMPERE, NEW JERSEY, A CORPORATION OF NEW JERSEY.

MEANS FOR MAINTAINING MOTORS IN DEFINITE SPEED RELATION.

Application filed November 2, 1926. Serial No. 145,748.

In the operation of paper-making machines and also in the operation of rolling mills, the material operated on passes in succession over a number of rolls and in passing each set of rolls the material is changed in length so that the different sets of rolls require to be driven at slightly different speeds which are exactly suited to the changes in length of the material.

The object of this invention is to provide separate motors for each of the several groups of rolls and in conjunction with each motor provide automatic regulating means by which to insure for the motor a speed which will bear a precise speed relation to a reference speed source, which speed relation shall also be adjustable but will remain constant to the adjusted relation. Further objects are to provide means for this purpose of simple and of reliable character.

In the accompanying sheet of drawings which forms a part of this description,

Figure 1:
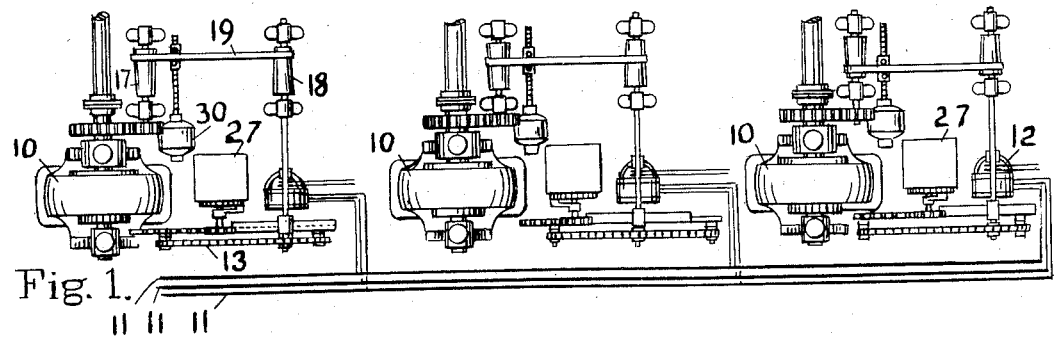
Figure 1 shows in plan a number of motors with regulating means connected through a reference speed source in accordance with this invention.
Figure 2:
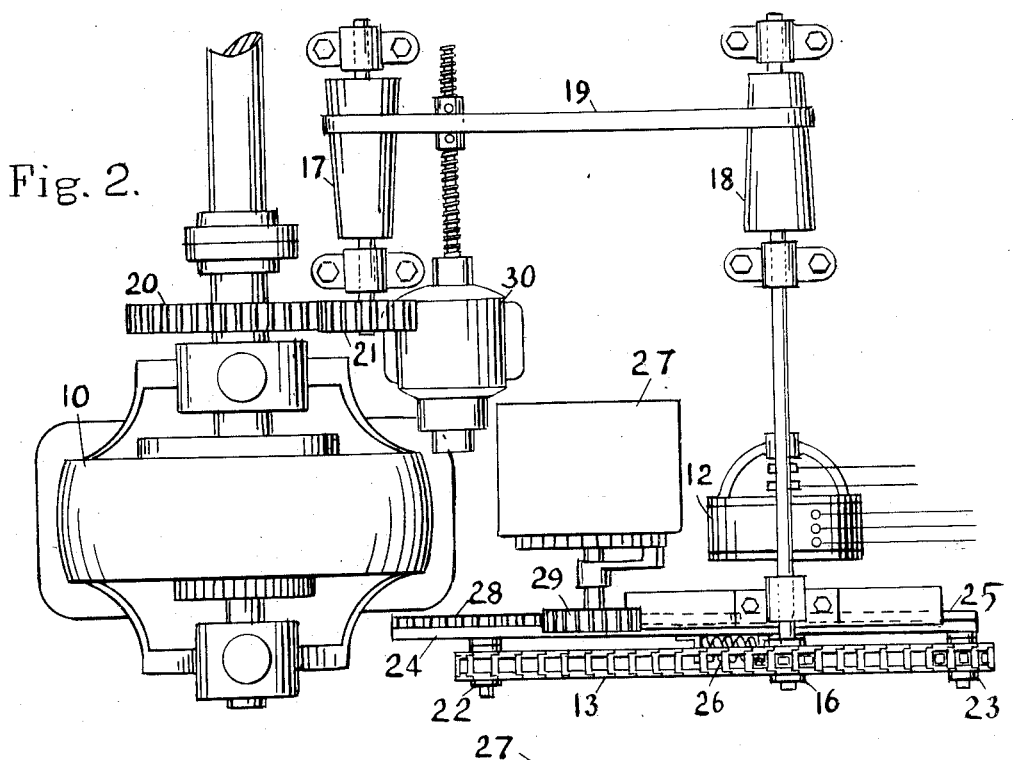
Fig. 2 is a plan view including one of the driving motors and its associated regulating means drawn to a larger scale.
Figure 3:
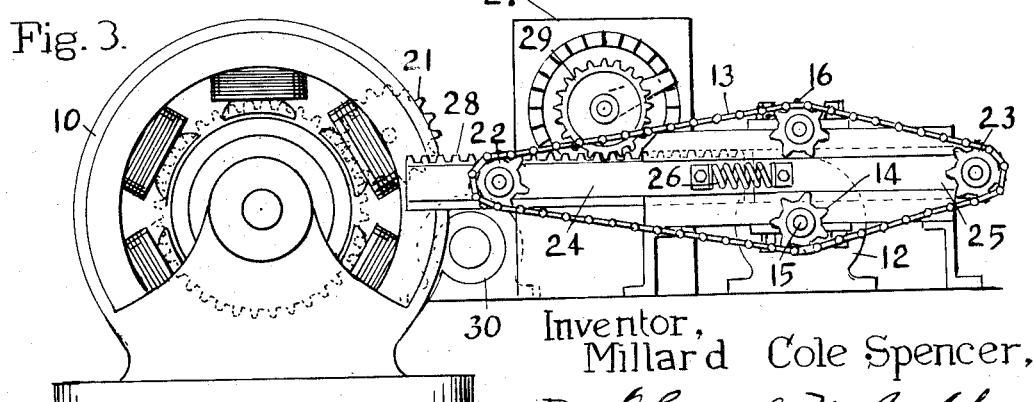
Fig. 3 is an elevation of the same.

Main driving motors 10, 10 are used each to drive a group of paper drying and pressing rolls or a pair of rolls of a rolling mill, in which the material operated upon before leaving one group or pair of rolls is engaged by the next group or pair of rolls. A source of three-phase current on leads 11, 11, 11 constitutes a reference speed source and in association with each main driving motor is a synchronous motor 12 which has its stator energized from this three-phase source and has its rotor energized by direct current. An endless chain 13 is engaged and driven by a sprocket 14 and driving connections which may be a shaft 15 connect it to the synchronous motor. A second sprocket 16 also drives the chain through a driving connection which connects it to the main driving motor. In one of the driving connections and as shown in the driving connection to the main driving motor is a variable transmission which may consist as shown of cone pulleys 17, 18 and a connecting belt 19. The sprockets are driven at almost precisely the same speed except for a temporary gain or loss of a fraction of a revolution of one sprocket with respect to the other. Gears 20, 21 provide for any considerable disparity in speed between the main driving motor and the synchronous motor which is not readily provided by the variable transmission, and also speed up the apparatus so that it will be more quickly responsive to speed variations which require correction. The chain also passes over idler sprockets 22, 23 carried on movable supports, which, as shown, are two slides 24, 25. These slides travel in the same ways and are pressed in opposite directions by a spring 26 to hold the chain taut on the sprockets. An electric speed regulator 27 which is conveniently a rheostat with many close steps is provided for controlling the shunt field of the driving motor. Connection is made by means of rack teeth 28 on one of the slides and a gear 29 on the shaft of the speed regulator.

In the operation of rolling mills it is desirable to have control from a remote point where the operator from a safe position can observe the passing of the sheets or bars from one mill to the next and make any speed adjustments which are seen to be necessary. For this purpose a motor 30 which is under control of the operator is provided in conjunction with each variable transmission. Should the main driving motor momentarily gain or lose with respect to the speed ratio required then the sprocket 16 will gain or lose with respect to the sprocket 15 and the slides will be shifted and the regulator operated to slow up or speed up the main driving motor so as to bring it back into proper speed relation to the other motors.

I claim:

A system of motor control for maintaining a number of motors in definite speed relation which comprises a reference speed source for the motors, and in combination with each motor an endless chain, two sprockets for engaging and driving the chain, driving connections between the motor and one of the sprockets, driving connections between the reference speed source and the other sprocket, a variable transmission in one of the driving connections, idlers for the chain, movable supports for the idlers, an electric speed regulator for the motor, and driving connections between one of the movable supports for the idlers and the speed regulator.

MILLARD COLE SPENCER.